April 12, 1960 R. A. CAMPBELL 2,932,526
CANE-SIMULATING LUGGAGE CARRIER
Filed Aug. 20, 1958 2 Sheets-Sheet 1
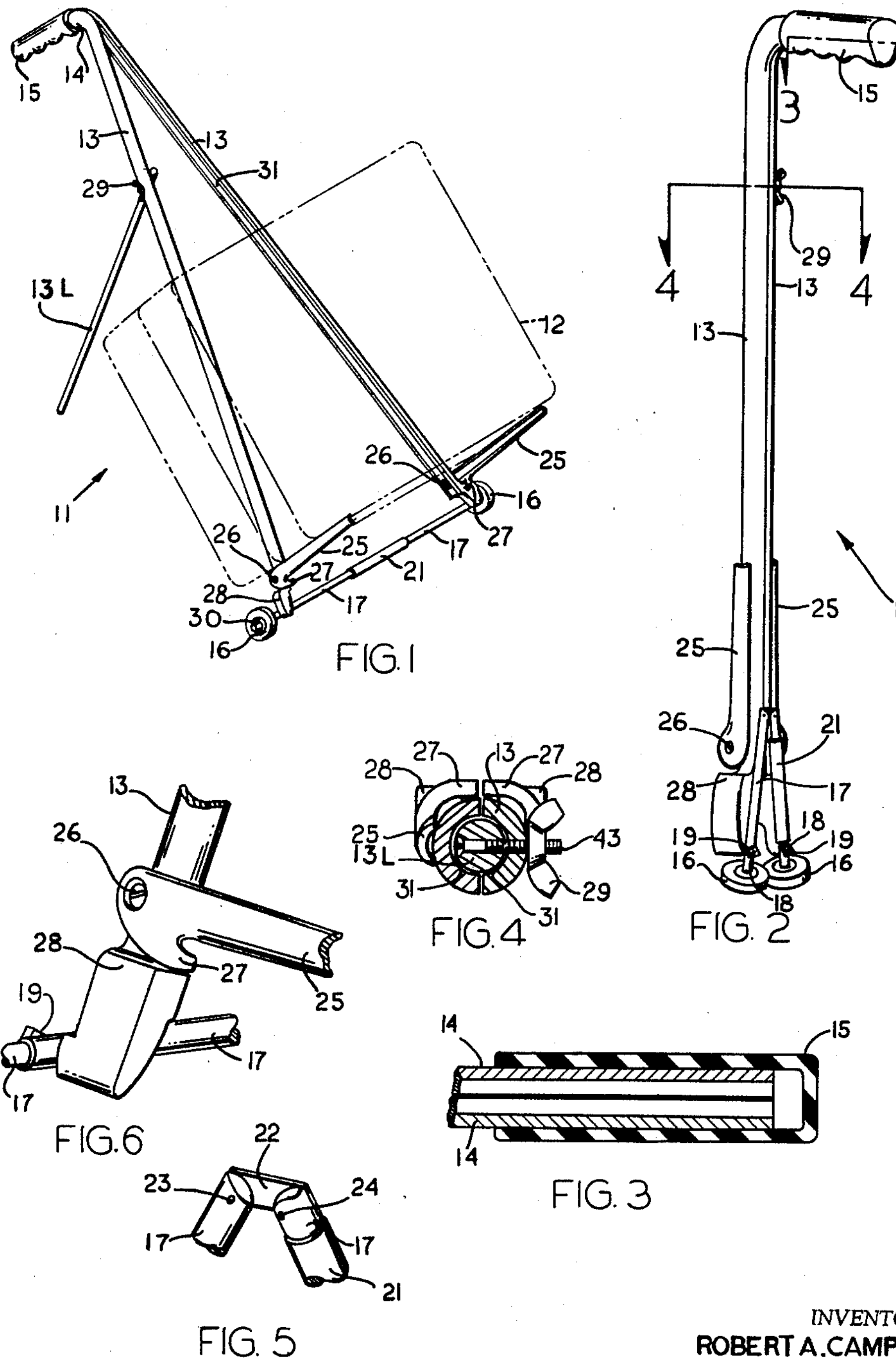
INVENTOR.
ROBERT A. CAMPBELL April 12, 1960 R. A. CAMPBELL 2,932,526
CANE-SIMULATING LUGGAGE CARRIER
Filed Aug. 20, 1958 2 Sheets-Sheet 2
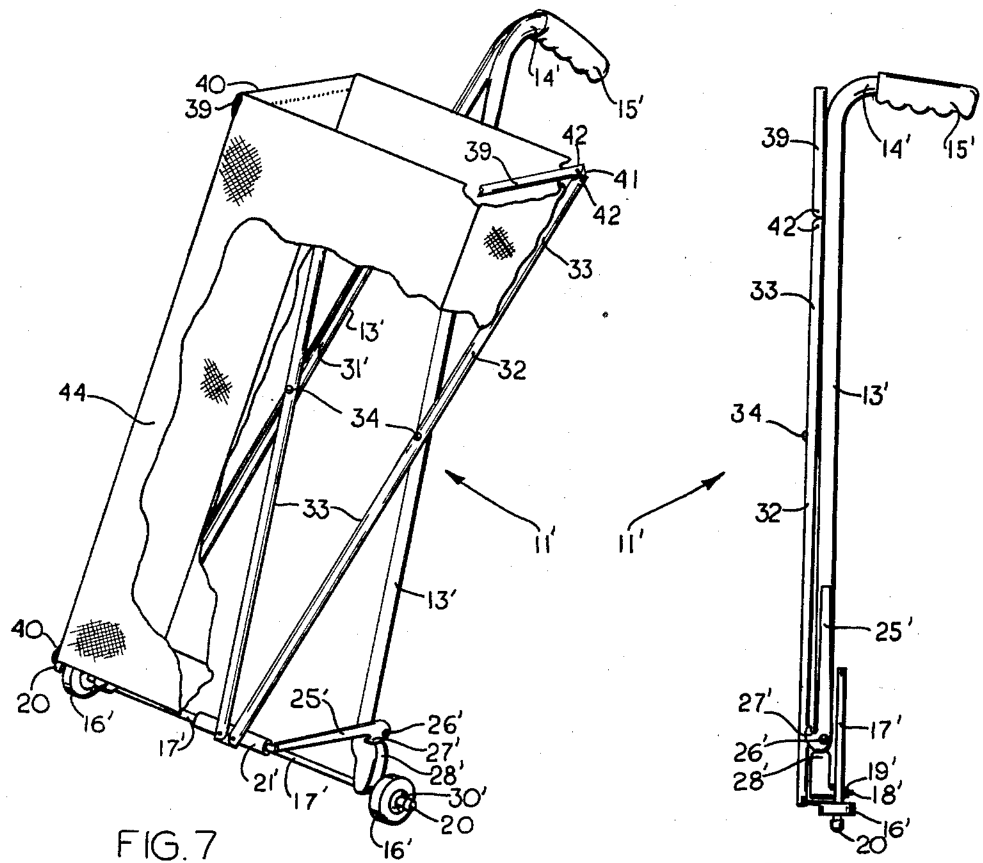
FIG.7
FIG.9
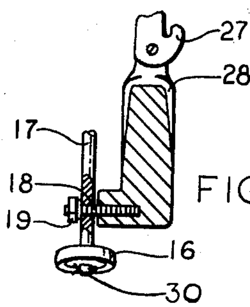
FIG.10
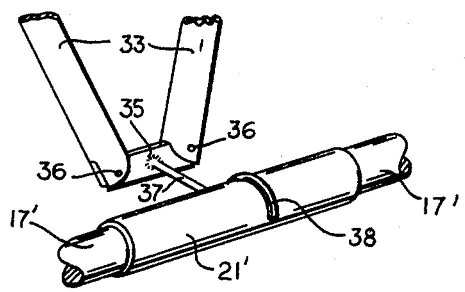
FIG.8
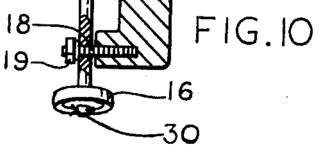
INVENTOR.
ROBERT A. CAMPBELL United States Patent Office 2,932,526

Patented Apr. 12, 1960

1

2,932,526

CANE-SIMULATING LUGGAGE CARRIER

Robert A. Campbell, Oak Park, Ill.

Application August 20, 1958, Serial No. 756,202

13 Claims. (Cl. 280—42)

Generally speaking, the present invention relates to the carrier art and, more specifically, relates to a collapsible carrier which can be conveniently used as a cane when not transporting articles.

An object of the present invention is to provide a collapsible object carrier which can easily and conveniently carry bulky articles and which can be quickly and easily folded into a compact, sturdy cane.

Another object of the present invention is to provide a lightweight folding object carrier which can be quickly collapsed and which is especially adapted for travelers having a need for a luggage carrier that is compact for convenient storage on trips and yet strong enough to carry several suitcases, parcels, and the like.

Yet another object of the present invention is to provide a collapsible object carrier having a collapsible open top bag means which is removably mounted thereon in order to carry a great number of articles therein.

A still further object of the present invention is to provide a collapsible object carrier capable of tripod-like support and including a centrally hinged axle which is extendable into a straight horizontal position.

Another object of the present invention is to provide a device of the character set forth in the preceding objects, which is relatively inexpensive, simple, easy-to-operate and of virtually foolproof construction.

Other and allied objects will be apparent to those skilled in the art after a careful perusal, examination, and study of the accompanying illustrations, the present specification, and the appended claims.

To facilitate understanding, reference will be made to the hereinbelow-described figures, in which Fig. 1 is a perspective view of the collapsible luggage cane in an extended carrying position with the tripod leg extended;

Fig. 2 is a perspective view of the present invention in a collapsed cane-simulating position;

Fig. 3 is a fragmentary sectional view of the elastomeric handle taken along the lines 3—3 in Fig. 2;

Fig. 4 is a fragmentary sectional view taken along the lines 4—4 in Fig. 2;

Fig. 5 is a fragmentary perspective view of the centrally hinged axle;

Fig. 6 is a fragmentary perspective view of one of the pivotally mounted carrying arms in an outwardly projecting use position;

Fig. 7 is a perspective view of another version of the collapsible object carrier having collapsible open top bag means;

Fig. 8 is a rearward fragmentary perspective view of the bag support frame in an extended, bag-carrying position, as shown in Fig. 7;

Fig. 9 is a side elevational view of the modification shown in Fig. 7 in a collapsed cane-simulating position; and Fig. 10 is a fragmentary sectional view showing the pivotal mounting of the centrally-hinged axle.

2

The collapsible luggage carrier 11 has an extended luggage-carrying position, as best shown in Fig. 1, and a collapsed position, as best shown in Fig. 2, which simulates a cane when in the non-use position. When the luggage carrier 11 is in the collapsed cane-simulation position the traveler has a lightweight cane or walking stick which is useful and yet always quickly available for transporting luggage 12.

The luggage cart 11 is provided with a longitudinal cane body which is longitudinally slit to comprise two longitudinal cane body sections 13. These two cane body sections 13 are bent at the top thereof to form handle portions 14, which are resiliently fastened together by means of a resilient elastomeric handle cover 15 which encompasses and fastens together the top handle portions 14 of the cane body sections 13, as best illustrated in Fig. 3.

The cane body elements 13 are separable at the bottom and along the length thereof and are extendable into an inverted V-shaped configuration when in the luggage-carrying or luggage-support position, as shown in Fig. 1.

A pair of rotatable wheels 16 are carried at the bottom of the cane body sections 13 by means of the centrally hinged axle 17 which is pivotally attached to the bottoms of the cane sections 13 by the pivot pins 18, as shown in Figs. 1, 2, and 10. The outer ends of the centrally hinged axle 17 carry the pair of rotatable wheels 16 which are secured thereon by means of cotter pins 30, as best shown in Fig. 1. The nuts 19 secure the centrally hinged axle 17 onto the pivot pins 18. The pivot pins 18 are threaded at both ends and are screwed into interiorly threaded apertures in the bottoms of the cane body sections 13.

The centrally hinged axle 17 extends into a substantially straight horizontal position when the luggage carrier 11 is extended into the luggage use position and the cane body sections 13 are opened into said inverted V-shaped configuration, as shown in Fig. 1, and is folded into an upwardly directed, inverted V-shaped configuration when the two longitudinal cane body sections 13 are in side-by-side relationship, as shown in Fig. 2.

The centrally hinged axle 17 includes a central hinge plate 22 which is pivotally mounted at 23 and 24 to the axle 17, as best illustrated in Fig. 5. A slidable sleeve 21 on the axle 17 controllably locks staid hinged axle 17 in the straight horizontal position when slidably positioned over the hinge plate 22.

A pair of luggage-carrying arms 25 are pivotally mounted at 26 to each of the longitudinal cane body sections 13 near the bottom thereof. These carrying arms 25 are movable from the upwardly directed non-use position which is substantially parallel to the longitudinally cane body sections 13, as shown in Fig. 2, and into an outwardly projecting use position whereon a piece of luggage 12 (or other object) may be carried, as illustrated in Figs. 1 and 6.

The carrying arms 25 include a flanged stop portion 27 which abuts the detent members 28 on the bottoms of the cane body elements 13 when the arms 25 are actuated into said use position thereby limiting the downward pivotal movement and providing a supporting stop for said carrying arms 25. The flanged stop portions 27 also limit the upward pivotal movement of the carrying arms 25.

A tripod leg 13L is pivotally mounted by means of the wing nut 29 and screw 43 to the longitudinal inner concave portion 31 of the cane body elements 13, as best shown in Fig. 4, whereby the tripod leg 13L may be recessed out of the way when the carrier 11 is in the non-use position. When the luggage carrier 11 is extended into the use position the tripod leg 13L can be downwardly and rearwardly swung out into an inclined supporting use position, as shown in Fig. 1, thereby providing a tripod-like three point support for the luggage carrier 11 and luggage 12. The wing nut 29 locks the tripod leg 13L in the tripod support position and also the recessed non-use position. The wing nut 29 must be loosened and the tripod leg 13L must be shifted laterally with respect to the cane body elements 13 in order to move the tripod leg 13L into the use position and conversely to actuate into the recessed non-use position.

Figs. 7–9 illustrate a modified version of the present invention and corresponding parts will be numbered similarly, primed however. In this particular version of the present invention, a collapsible open top bag 44 is removably mounted on a bag support frame 32 and with respect to the carrying arms 25′ in order to receive and carry a plurality of objects therein.

The bag support frame 32 includes two longitudinal frame members 33 which are pivotally mounted to the cane body sections 13′ by the screws 34. The lower ends of the frame members 33 are pivotally mounted to the hinge plate 35 by the pivot pins 36. At the rear of the hinge plate 35 is attached, by means of a support arm 37, a substantially semicircular hook member 38 which is slidably mounted on top of the sleeve 21′ when the carrier 11′ is in the use position, as shown in Figs. 7 and 8. The bag support frame 32 is controllably engageable with the centrally hinged axle 17′ and the body sections 13′ whereby the supoprt frame 32 may be collapsed into the non-use position, as shown in Fig. 9, and extended into the use position, as shown in Fig. 7.

At the upper ends of the frame members 33 are pivotally mounted upper bag support arms 39. The bag support arms 39 and the carrying arms 25′ are removably insertable into the bag sleeves 40. The hinge plate 41 and the pivot pins 42 pivotally connect the bag arms 39 with respect to the frame members 33.

The lower end of the bag arms 39 and the upper end of the frame members 33 abut and form a stop when the bag arms 39 are pivoted into the bag support position, as shown in Fig. 7. The bag support arms 39 are frictionally locked into the non-use position, as shown in Fig. 9.

Also, in this modification, the rotatable wheels 16′ are provided with elastomeric, non-skid tips 20, as best shown in Figs. 7 and 9, which are removable for quick replacement. These tips 20 will secure the object carrier 11′, when it is in the cane-simulation position, on slippery and slick surfaces (as best illustrated in Fig. 9 of the modified version of the present invention).

Numerous modifications and variations of the present invention will occur to those skilled in the art after a careful study hereof. All such properly within the basic spirit, scope and/or teachings of the present invention are intended to be included and comprehended herein as fully as if specifically described, illustrated, and claimed.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. A collapsible object carrier simulating a cane when in non-object-carrying use position, comprising: a longitudinal cane body means provided with cane handle means adjacent the top thereof, said longitudinal cane body means having ground-contactable means at the bottom thereof, said longitudinal cane body means being longitudinally slit and comprising two longitudinal cane body elements fastened together adjacent the top thereof and separable at the bottom thereof and along the length thereof into an inverted V-shaped configuration, said ground-contactable means including a pair of rotatable wheels provided with a centrally hinged axle extending therebetween and folded into a V-shaped configuration, when said two longitudinal cane body elements are in side-by-side relationship, said centrally hinged axle having its ends carrying said rotatable wheels pivotally attached with respect to the lower ends of corresponding ones of said longitudinal cane body elements and being movable and extendable into a substantially straight horizontal position between the lower ends of said longitudinal cane body elements when they are opened into said inverted V-shaped configuration.

2. Apparatus of the character defined in claim 1, including means for controllably locking said centrally hinged axle in said straight horizontal position.

3. A collapsible object carrier simulating a cane when in non-object-carrying use position, comprising: a longitudinal cane body means provided with cane handle means adjacent the top thereof, said longitudinal cane body means having ground-contactable means at the bottom thereof, said longitudinal cane body means being longitudinally slit and comprising two longitudinal cane body elements fastened together adjacent the top thereof and separable at the bottom thereof and along the length thereof into an inverted V-shaped configuration, said ground-contactable means including a pair of rotatable wheels provided with a centrally hinged axle extending therebetween and folded into a V-shaped configuration, when said two longitudinal cane body elements are in side-by-side relationship, said centrally hinged axle having its ends carrying said rotatable wheels pivotally attached with respect to the lower ends of corresponding ones of said longitudinal cane body elements and being movable and extendable into a substantially straight horizontal position between the lower ends of said longitudinal cane body elements when they are opened into said inverted V-shaped configuration; and carrying arms pivotally mounted on each of said longitudinal cane body elements adjacent the bottom thereof and movable between corresponding upwardly directed non-use positions substantially parallel to said longitudinal cane body elements and corresponding outwardly projecting use positions positioned adjacent said straight harizontal axle for receiving and carrying an object thereon.

4. Apparatus of the character defined in claim 3, including means for controllably locking said centrally hinged axle in said straight horizontal position.

5. Apparatus of the character defined in claim 3, including stop means limiting the downward and outward pivotal movement of said carrying arms to said use positions; and slidable sleeve means on said axle for controllably locking said centrally hinged axle in said straight horizontal position.

6. Apparatus of the character defined in claim 3, including leg means controllably pivotally mounted at the top thereof with respect to said longitudinal cane body at a point remote from the bottom thereof and controllably movable from a normal non-use position parallel to said longitudinal cane body means into a supporting use position downwardly and rearwardly inclined with respect to said longitudinal cane body means when said longitudinal cane elements are laterally separated at the bottom thereof in said inverted V-shaped configuration, thus providing a tripod-like three-point support for the entirely longitudinal cane body means.

7. Apparatus of the character defined in claim 3, wherein said handle means comprises a resilient elastomeric handle encompassing and fastening together the top ends of said longitudinal cane body elements.

8. Apparatus of the character defined in claim 3, including a collapsible bag support frame provided with engaging means controllably engageable with said axle and said longitudinal cane body means for support thereby.

9. Apparatus of the character defined in claim 8, including collapsible open top bag means removably mountable on said bag support frame and maintained in supported upwardly open position thereby for receiving and carrying a plurality of objects therein.

10. A collapsible luggage carrier simulating a cane when in non-luggage-carrying use position, comprising: a longitudinal cane body means provided with cane handle means at the top thereof, said longitudinal cane body means having ground-contactable means at the bottom thereof, said longitudinal cane body means being longitudinally slit and comprising two longitudinal cane body elements resiliently fastened together at the top thereof by said handle means and separable at the bottom thereof and along the length thereof into an inverted V-shaped configuration, said ground-contactable means including a pair of rotatable wheels provided with a centrally hinged axle extending therebetween and folded into an upwardly directed inverted V-shaped configuration, when said two longitudinal cane body elements are in side-by-side relationship, said centrally hinged axle having its ends carrying said rotatable wheels pivotally attached with respect to the lower ends of corresponding ones of said longitudinal cane body elements and being movable and extendable into a substantially straight horizontal position between the lower ends of said longitudinal cane body elements when they are opened into said inverted V-shaped configuration; slidable sleeve means on said axle for controllably locking said centrally hinged axle in said straight horizontal position; and luggage carrying arms pivotally mounted on each of said longitudinal cane body elements adjacent the bottom thereof and movable between corersponding upwardly directed non-use positions substantially parallel to said longitudinal cane body elements and corresponding outwardly projecting use positions positioned adjacent said straight horizontal axle for receiving and carrying luggage thereon.

11. Apparatus of the character defined in claim 10, including leg means controllably pivotally mounted at the top thereof with respect to said longitudinal cane body at a point remote from the bottom thereof and controllably movable from a normal non-use position parallel to said longitudinal cane body means into a supporting use position downwardly and rearwardly inclined with respect to said longitudinal cane body means when said longitudinal cane elements are laterally separated at the bottom thereof in said inverted V-shaped configuration, thus providing a tripod-like three-point support for the entire longitudinal cane body means.

12. Apparatus of the character defined in claim 10, including a collapsible substantially V-shaped bag support frame provided with hook engaging means controllably engageable with said axle and said longitudinal cane body means for support thereby.

13. Apparatus of the character defined in claim 12, including collapsible open top bag means removably mountable on said bag support frame and maintained in supported upwardly open position thereby for receiving and carrying a plurality of objects therein.

References Cited in the file of this patent

UNITED STATES PATENTS

| | | |
|---|---|---|
| 657,947 | MacGill | Sept. 18, 1900 |
| 947,419 | Pecht | Jan. 25, 1910 |
| 1,110,162 | Taylor | Sept. 8, 1914 |
| 2,812,950 | Holloway | Nov. 12, 1957 |

FOREIGN PATENTS

| | | |
|---|---|---|
| 22,575 | Great Britain | 1910 |